United States Patent [19]

Fell

[11] Patent Number: 5,626,273
[45] Date of Patent: May 6, 1997

[54] RECORDING AND/OR REPRODUCING APPARATUS WITH MOVABLE GUIDE ROLLER

[75] Inventor: Wolfgang Fell, Seeheim, Germany

[73] Assignee: U.S. Philips Corporation, New York, N.Y.

[21] Appl. No.: 381,605

[22] Filed: Jan. 27, 1995

[30] Foreign Application Priority Data

Feb. 18, 1994 [DE] Germany ............................ 44 05 154.9

[51] Int. Cl.$^6$ ........................ B65H 23/32; B65H 57/14
[52] U.S. Cl. ..................... 226/194; 226/199; 242/615.2
[58] Field of Search ........................... 226/168, 190, 226/194, 199; 242/615.2

[56] References Cited

U.S. PATENT DOCUMENTS

| | | | |
|---|---|---|---|
| 4,441,133 | 4/1984 | Ogawa et al. | 242/615.2 |
| 4,729,500 | 3/1988 | Gwon | 226/190 |
| 5,301,864 | 4/1994 | Saito et al. | 242/615.2 |
| 5,373,982 | 12/1994 | Takahashi | 226/194 |
| 5,407,117 | 4/1995 | Yokoo et al. | 226/190 |
| 5,501,386 | 3/1996 | Kobayashi | 226/190 |

FOREIGN PATENT DOCUMENTS

| | | | |
|---|---|---|---|
| 2373853 | 7/1978 | France . | |
| 2656026 | 3/1982 | Germany . | |
| 3127340A1 | 4/1982 | Germany . | |
| 0600602 | 3/1978 | U.S.S.R. | 226/194 |

*Primary Examiner*—Daniel P. Stodola
*Assistant Examiner*—Matthew A. Kaness
*Attorney, Agent, or Firm*—Michael E. Marion

[57] ABSTRACT

A recording and/or reproducing apparatus comprising a guide roller for guiding and diverting a magnetic tape. The guide roller includes a roller member, which is rotatably and pivotably mounted on a shaft, and a guide flange for the magnetic tape, which guide flange is disposed near the shaft bearing location, the lower edge of the magnetic tape being pressed against the guide flange. In order to reduce the force exerted on the lower edge of the magnetic tape a stationary roller member is interposed between the rotatable roller member and the guide flange, and the two roller members are movable relative to one another in the direction of the bisector of the wrapping angle of the magnetic tape.

20 Claims, 4 Drawing Sheets

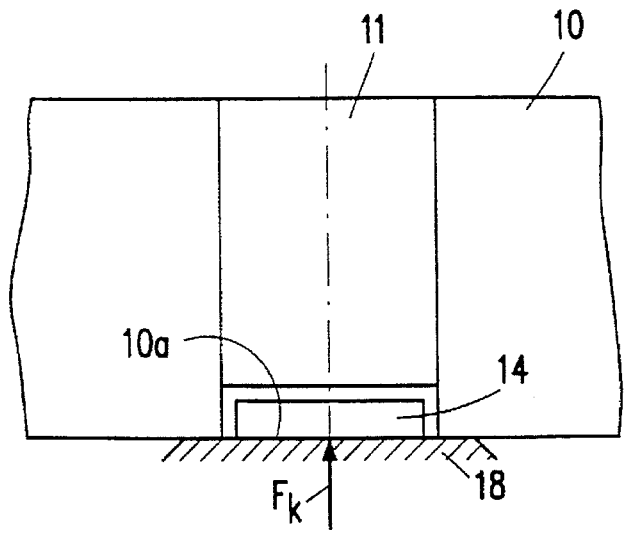
FIG. 2a
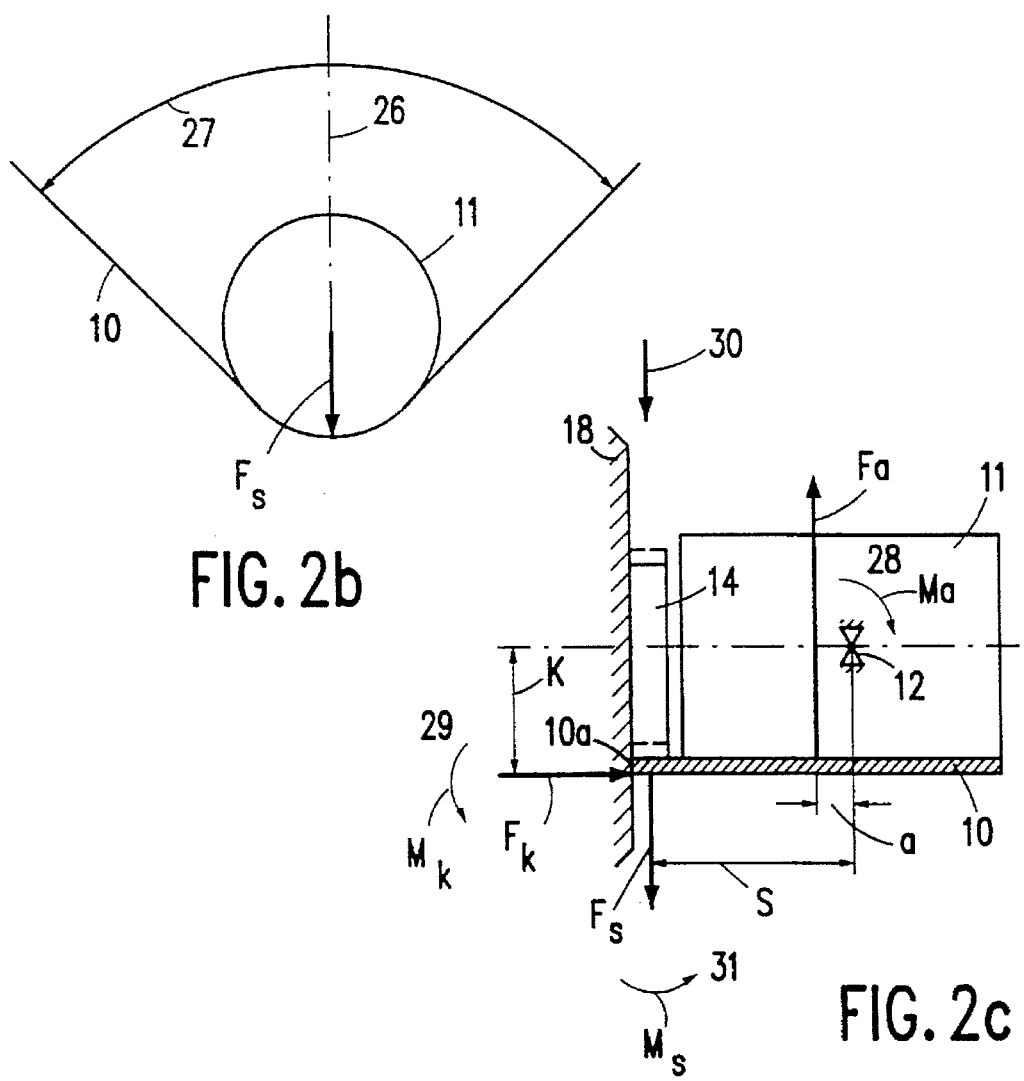
FIG. 2b
FIG. 2c
$$F_a \cdot a = F_k \cdot K + F_s \cdot S$$
$$M_a = M_k + M_s$$

RECORDING AND/OR REPRODUCING APPARATUS WITH MOVABLE GUIDE ROLLER

The invention relates to a recording and/or reproducing apparatus comprising a guide roller for guiding and diverting a magnetic tape, which roller comprises a roller member, which is rotatably and pivotably mounted on a shaft, and a guide flange for the magnetic tape, which guide flange is disposed near the shaft bearing location, the lower edge of the magnetic tape being pressed against the guide flange.

Such guide rollers are employed, for example, in magnetic tape recording apparatuses for television uses. These apparatuses have a cylinder provided with a rotary head disc, around which the magnetic tape is wrapped along a helical path. Said guide rollers serve to guide and divert the magnetic tape. For a satisfactory picture quality it is necessary that the magnetic tape is guided exactly by these guide rollers. The guide roller which immediately precedes the cylinder is primarily responsible for a correct guidance of the magnetic tape. For the high-density recording technology which is now customary, all recordings are always oriented relative to a given reference edge of the magnetic tape. This means that the magnetic tape should be guided exactly relative to one tape edge.

A guide roller which guides the magnetic tape at one edge is known, for example, from a magnetic recording and/or reproducing apparatus described in DE-PS 26 56 026. This known construction comprises a pivotable guide roller mounted on a shaft by means of a radial ball-bearing. The ball-bearing is off-centered in relation to the width of the magnetic tape to be guided by the guide roller. Moreover, the fixed guide flange is disposed near the guide roller end which is remote from the ball-bearing. With the off-centered arrangement the bearing play of the radial ball-beating is utilised in such a manner that the axis of the rotating roller member is pivoted relative to the stationary shaft carrying the inner race of the radial ball-bearing. Thus, in the case of small fluctuations of the angle of contact of the tape the part of the roller member which is in contact with this tape can follow these fluctuations. This results in an equilibrium of forces between a force exerted on the guide flange by the magnetic tape and a tape-edge guiding force exerted on the lower tape edge by the guide flange. The guide roller is then oriented in accordance with the prevailing forces. Thus, as a result of the drift component caused by the asymmetrical bearing construction of the guide roller, the reference edge constantly engages against the fixed guide flange with a certain force. This enables a correct lateral guidance of the magnetic tape to be obtained but the permissible lateral guiding forces which can be transmitted by the tape material are limited. Thin tapes should be guided with substantially smaller lateral forces. Whereas such a known construction functions without any problems with the comparatively thick magnetic tapes used until now, it is not unlikely with magnetic tapes whose thickness decreases continually that the magnetic tape is creased and is consequently damaged.

It is an object of the invention to improve the recording and/or reproducing apparatus comprising a guide roller of the defined in the opening paragraph so as to preclude undesirable tape edge damage even when very thin magnetic tapes are used.

According to the invention this object is achieved in that
a) a stationary roller member, stationary during bearing operation is interposed between the rotatable roller member and the guide flange, and
b) the two roller members are movable relative to one another in the direction of the bisector of the wrapping angle of the magnetic tape.

With such a construction of the two roller members either the one or the other roller member is movable, one roller member being immobile when the other roller member is moved. As a result of the relative movement of said roller members the non-rotatable stationary lower roller member may project from the circumferential surface of the rotatable roller member, so that this stationary roller member exerts an additional force the magnetic tape. In the operating condition the forces and the corresponding moments are in equilibrium. This means that the force exerted on the lower tape edge by the guide flange decreases as the force exerted on the tape by the stationary roller member increases. This enables the force exerted on the tape edge by the guide flange to be adjusted in a well-defined and controlled manner. This means that, for example when thin magnetic tapes are used, the force exerted on the lower tape edge by the guide flange can be reduced in a well-defined manner by adjusting the two roller members relative to one another. The force exerted on the magnetic tape by said roller member thus has a relieving effect. This mitigates the risk of damage to the magnetic tape or completely precludes this risk because in the boundary case the edge guiding force can even be eliminated.

In an embodiment of the invention, the rotatable roller member is off-centered relative to the width of the magnetic tape guided by the guide roller. The rotatable roller member may, for example, also be slightly tapered. Both measures ensure in a simple manner that the magnetic tape is pressed against the guide flange with its lower edge.

In a further embodiment of the invention, the stationary roller member is constructed to be movable relative to the rotatable roller member in a direction towards the magnetic tape. With such a construction the stationary roller member is moved towards the magnetic tape in the direction of the bisector until a desired reduction of the tape guide force acting on the lower tape edge is obtained. The stationary roller member is adjusted by means of, for example, a radial adjustment screw.

In yet another embodiment of the invention, the rotatable roller member is mounted on the shaft via a radial ball-beating, in that the shaft has a height adjustment screw at its free end, and in that the stationary roller member is pressed against the guide flange by this screw via the ball-bearing inner race and via sleeve-shaped spacers provided at opposite sides of said inner race. This provides a simple possibility of fixing the desired position of the stationary roller member.

In a further embodiment of the invention, the rotatable roller member is arranged to be movable relative to the stationary roller member in a direction away from the magnetic tape. This construction has the advantage that the rotatable roller member may be accessible more easily than the stationary roller member. With such a construction the rotatable roller member is moved until the corresponding surface of the stationary roller member comes into force-transmitting contact with the magnetic tape.

In an embodiment of the invention the rotatable roller member is moved, for example, in that at a constricted portion above the guide flange the shaft carrying the guide roller is constructed in such a manner that it can be bent away from the magnetic tape in the direction of the bisector. The parallelism between the circumferential surfaces of the ball-beating outer race (with the rotatable roller member) and the stationary roller member is maintained owing to the radial play of the ballbearing. The surfaces are merely moved parallel to the one another over the desired distance.

Another possibility of adjusting the rotatable roller member is obtained in that the shaft has a reduced diameter at the location of the inner race radial ball-bearing and in that after a transverse adjustment in the direction the radial ball-bearing can be immobilised by tightening the height adjustment screw at the free end. Such a parallel movement of the radial ball-bearing also causes the rotatable roller member mounted on the outer race of the ball-bearing to be moved over the desired distance parallel to the circumferential surface of the stationary roller member.

BRIEF DESCRIPTION OF THE DRAWINGS

Embodiments of the invention will now be described in more detail, by way of example, with reference to the accompanying drawings. In the drawings:

FIGS. 2(a)–(c) shows a guide roller around which a magnetic tape is wrapped in a diagrammatic front view, plan view and side view, FIGS. 3(a), (b) show two diagrammatic side views of a guide roller for the parallel displacement of a rotatable roller member by bending the shaft, FIGS. 4(a), (b) show two diagrammatic side views of a guide roller for the parallel displacement of the rotatable roller member by means of a constriction of the shaft at the bearing location of the ball-bearing.

DESCRIPTION OF THE PREFERRED EMBODIMENTS

Figure 1:
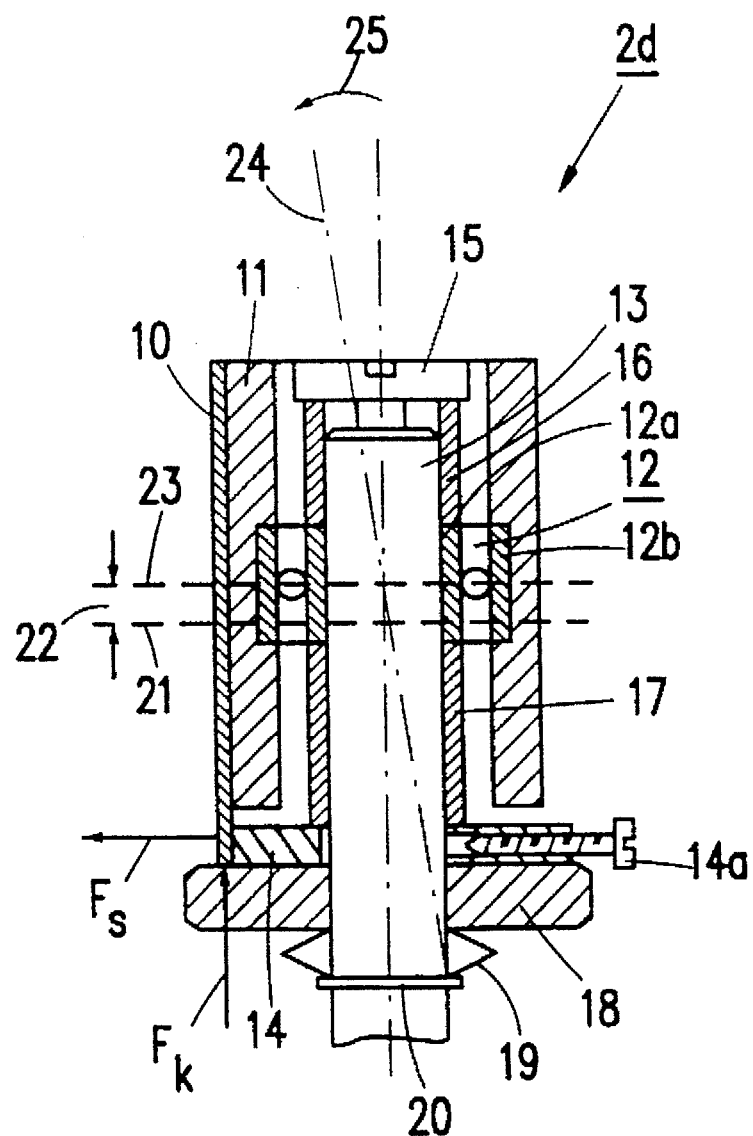
FIG. 1 is a sectional side view showing a guide roller in accordance with the invention.

FIG. 1 shows a guide roller for a magnetic tape 10 of a magnetic-tape apparatus, not shown. The guide roller has a cylindrical first roller member 11, which is mounted so as to be rotatable and pivotable on a stationary shaft 13 by means of a single ball-bearing 12. It also comprises a movable second roller member 14, which is pressed against a guide flange 18 by a height adjustment screw 15 via sleeved spacers 16, 17 and a ball-beating inner race 12a. The second roller member 14 is stationary and non-rotable during bearing operation. The guide flange 18 is mounted on the shaft 13 via a spring assembly 19 and a mounting flange 20. The first roller member 11, which is rotatably mounted on the shaft, and the second roller member 14, which is movable via an adjustment screw 14a, serves as a guide surface for the magnetic tape 10. The lower edge 10a of the magnetic tape 10 is in contact with the guide flange 18. The height adjustment screw 15 is tightened until the disc-shaped roller member 14 is clamped between the guide flange 18 and the spacer 17 by friction. The inner race 12a of the radial ball-bearing 12 is locked against axial movement by the two spacers 16, 17. The outer race 12b of the radial ball-bearing 12 is fixedly connected to the roller member 11.

A plane 21 through the center of the magnetic tape 10 extends at a distance 22 underneath the plane 23 through the center of the ball-bearing 12. Thus, by means of the bearing play of the radial ball-bearing 12 it is achieved that the axis 24 of the rotatable roller member 11 is tilted relative to the stationary shaft 13 in the direction indicated by an arrow 25. The tilting angle has been exaggerated for the sake of clarity. Thus, in the case of small fluctuations of the angle of contact of the tape the part of the roller member which is in contact with this tape can follow these fluctuations. Since the plane 23 of the radial ball-bearing 12 is situated above the plane 21 of the magnetic tape 10 the magnetic tape 10 is constantly pressed against the guide flange 18 with its lower edge 10a. This results in a correct and reliable lateral guidance of the magnetic tape 10. This leads to a certain friction between the lower edge 10a of the tape 10 and the guide flange 18, which has no adverse effect in the case of thicker magnetic tapes. However, in the case of thin magnetic tapes this friction may lead to creasing and damaging of the magnetic tape. In order to avoid this the movable roller member 14 has been provided. Its function will be explained by means of the diagrammatic views in FIGS. 2a–c.

FIGS. 2a–c show the guide roller with the magnetic tape 10 in a front view, a plan view and a side view. By means of the screw 14a the roller member 14 is moved in the direction of the bisector 26 of the wrapping angle 27 at which the magnetic tape 10 is wrapped around the guide roller. In operation the tape 10 is pressed against the guide flange 18 with a certain force. $F_k$ is the reactive edge guiding force exerted on the tape edge 10a by the guide flange 18.

In operation, as is shown in FIG. 2c, the magnetic tape 10 exerts a resultant force $F_a$ on the rotatable roller member 11, which as a result of the aforementioned eccentricity acts below the bearing location of the radial ball-bearing 12. With a distance a this force $F_a$ produces a moment $M_a$ in a direction 28. If, as is shown in broken lines in FIG. 2c, the stationary roller member 14 is not in contact with the magnetic tape 10, the force $F_k$ in conjunction with the distance k will produce a moment $M_k$ in a direction 29, which moment is in equilibrium with the moment $M_a$. If the roller member 14 is now moved in a direction 30 this roller member will come into contact with the magnetic tape 10, resulting in an additional force $F_s$ on the magnetic tape, which in conjunction with a distance s produces a moment $M_s$ in a direction 31. The moments $M_k$ and $M_s$ are then in equilibrium with the moment $M_a$. This reduces the force $F_k$ exerted on the tape edge 10a by the guide flange 18 depending on the force $F_s$ exerted by the roller member 14.

Figure 3A:
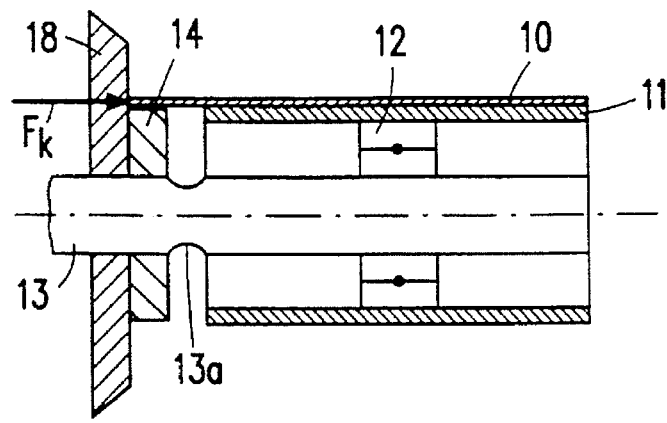
Figure 3B:
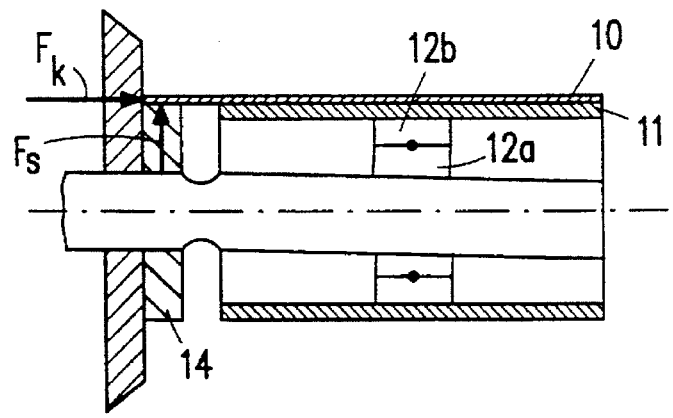
Figure 4A:
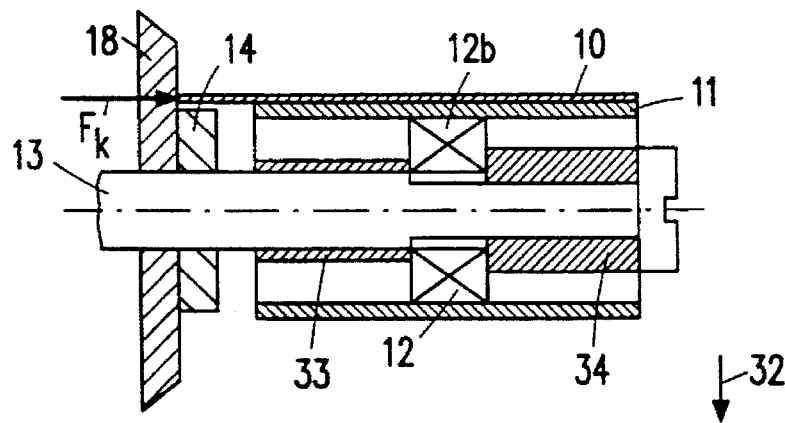
Figure 4B:
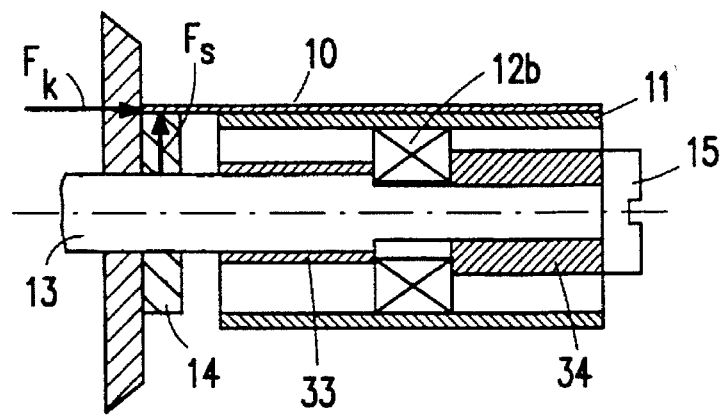

The same effect is obtained with the examples shown in FIGS. 3a, b and 4a, b, where instead of the disc-shaped roller member 14 the rotatable roller member 11 is constructed to be movable parallel to the roller member 14. FIGS. 3a, 4a show the basic position and FIGS. 3b, 4b show the adjusted position. In FIGS. 3a, b the shaft 13 has an annular constriction 13a above the roller member 14 so that it can be moved in the direction of the bisector of the wrapping angle of the magnetic tape 10, as is shown in FIG. 3b. The bending angle has been exaggerated for the sake of clarity. Bending results in the outer race 12b of the radial ball-bearing 12 being only moved in parallel, and not through an angle, owing to the tolerances of the radial ball-bearing 12. The resulting effect is the same as described above with respect to FIG. 2c, the stationary roller member 14 being pressed against the magnetic tape 10 and the tape guiding force $F_k$ being reduced as desired.

A similar effect can be obtained with a construction as shown in FIGS. 4a and 4b, the shaft 13 being of smaller diameter at the location of the ball-bearing 12, so that the radial ball-bearing and hence its outer race 12b with the rotatable roller member 11 secured thereto can be moved perpendicularly to the shaft 13, which also yields a parallel displacement of the rotatable roller member 11 relative to the circumferential surface of the stationary roller member 14. After the ball-bearing 12 has been moved in the direction 32 the inner race 12a of the ball-bearing is fixed in this position by means of the clamping sleeves 33, 34 and the adjustment screw 15.

Figure 5:
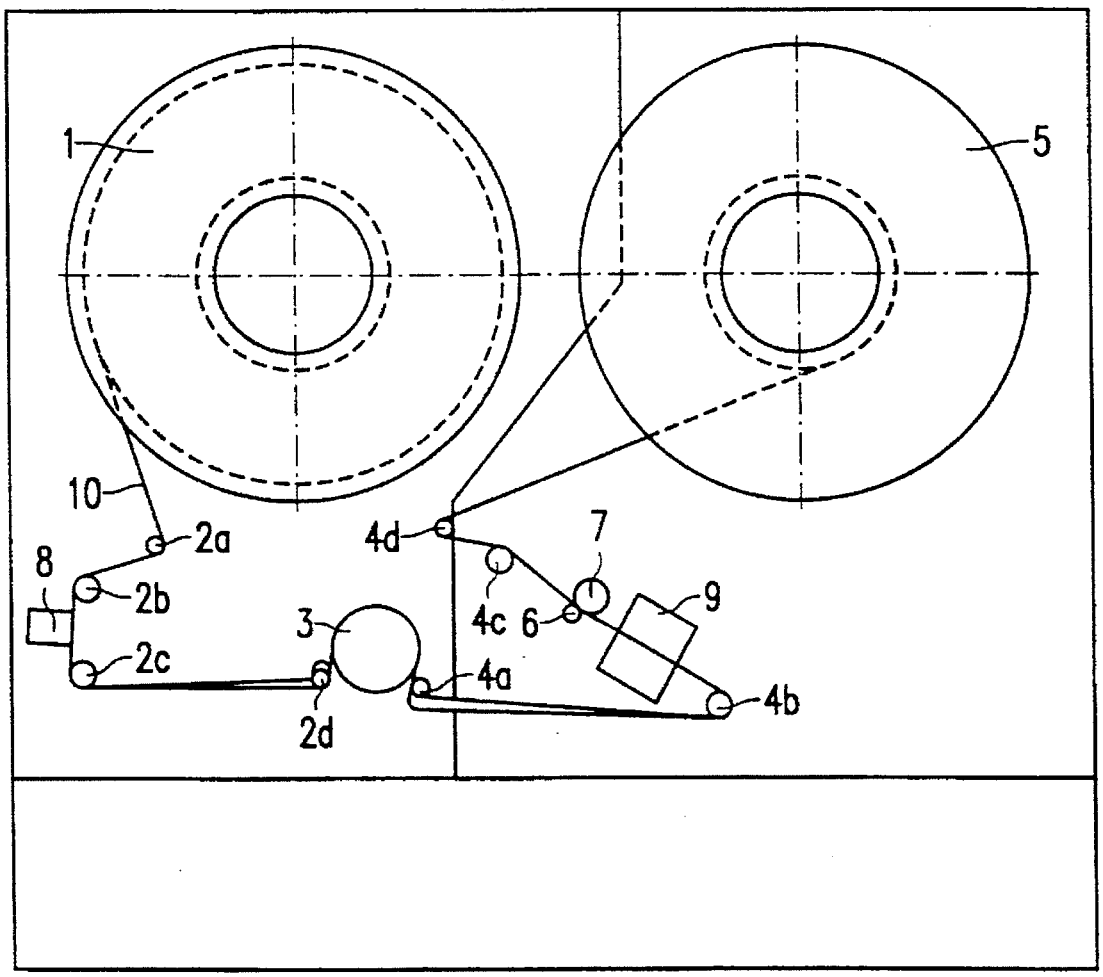
FIG. 5 is a plan view of a magnetic-tape apparatus.

FIG. 5 shows a magnetic-tape apparatus in which the magnetic tape 10 extends from a supply reel 1 to a take-up reel 5 via guide rollers 2a to 2d, a cylinder 3 and further guide rollers 4a to 4d. The cylinder 3 contains a scanning device in the form of a rotatable head disc, not shown. The tape is driven by means of a motor-driven drive roller 6, against which the magnetic tape 10 is pressed by a pressure roller 7. The reference numeral 8 denotes an erase head and a head unit 9 comprises a plurality of heads for recording and reproducing audio information as well as erase heads.

To enable the magnetic tape 10 to be guided over the cylinder 3 along a helical path, the axes of the two guide rollers 2d and 4a are inclined relative to the axis of the cylinder 3 and also relative to the axes of the ether guide rollers 2(a)–2(c) and 4(b)–4(d). The guide roller 2d shown in FIGS. 1 to 4 precedes the cylinder 3 viewed in the entry direction. This guide roller 2d is constructed in such a manner that in operation the cylindrical member 11 can be pivoted against the stationary shaft 13 under the influence of the forces exerted by the entering tape and the diverted tape at the exit side.

I claim:

1. A magnetic-tape recording and/or reproducing apparatus comprising a guide roller for guiding and diverting a magnetic tape, which guide roller comprises a shaft, a first roller member rotatably and pivotably mounted on said shaft, and a guide flange disposed near said first roller member for receiving an edge of the magnetic tape, the edge of the magnetic tape being pressed against the guide flange during operation over a wrapping angle, the wrapping angle having a bisector, comprising:
   a second roller member interposed between the first roller member and the guide flange,
   said second roller member being adjustable relative to the first roller member in the direction of said bisector,
   and means for affixing said first and second rollers relative to each other.

2. An apparatus as claimed in claim 1, characterized in that the second roller member constructed to be is constructed to be movable relative to the first roller member in a direction towards the magnetic tape.

3. An apparatus as claimed in claim 2, further comprising an adjustment screw for adjusting said second roller member relative to said first roller member.

4. An apparatus as claimed in claim 3, characterized in that the second roller member (i) is disc-shaped and (ii) pin-shaped.

5. A guide roller as claimed in claim 4, characterised in that the first roller member is mounted on the shaft via a radial ball-bearing having a race with opposite sides, the guide roller further includes sleeve-shaped spacers on said shaft at the opposite sides of the inner race, the shaft has a free end and a height adjustment screw at said free end, and wherein said means for affixing said first and second roller members relative to each other is characterized in that the second roller member is pressed against the guide flange by the height adjustment screw via the ball-bearing inner race (12a) and via the sleeve-shaped spacers.

6. A guide roller as claimed in claim 3, characterized in that the first roller member is mounted on the shaft via a radial ball-bearing having a race with opposite sides, the guide roller further includes sleeve-shaped spacers on said shaft at the opposite sides of the inner race, the shaft has a free end and a height adjustment screw at said free end, and in that the second roller member is pressed against the guide flange by the height adjustment screw via the ball-bearing inner race and via the sleeve-shaped spacers.

7. A guide roller as claimed in claim 2, further comprising an adjustment screw for adjusting said second roller member relative to said first roller member.

8. An apparatus as claimed in claim 2, characterized in that the second roller member is one of (i) disc-shaped and (ii) pin-shaped.

9. A guide roller as claimed in claim 2, characterized in that the first roller member is mounted on the shaft via a radial ball-bearing having a race with opposite sides, the guide roller further includes sleeve-shaped spacers on said shaft at the opposite sides of the inner race the shaft has a free end and a height adjustment screw at said free end, and in that the second roller member is pressed against the guide flange by the height adjustment screw via the ball-bearing inner race and via sleeve-shaped spacers provided at opposite sides of said inner race.

10. An apparatus as claimed in claim 1, characterized in that the first roller member is arranged to be movable relative to the second roller member in a direction away from the magnetic tape.

11. An apparatus as claimed in claim 10, characterized in that said shaft has a location of reduced diameter adjacent the guide flange, the shaft being constructed in such a manner that it can be bent away from the magnetic tape in the direction of the bisector of the wrapping angle.

12. A guide roller as claimed in claim 10, characterized in that the rotatable roller member is mounted in the shaft via a radial ball bearing, the shaft has (i) a reduced diameter at the location of the radial ball-bearing, the ball bearing being adjustable transverse to the shaft at said reduced-diameter location, (ii) a free end and (iii) a height adjustment screw at said free end, and and in that, after a transverse adjustment relative to the shaft, the radial ball-bearing can be immobilized by tightening the height adjustment screw at the free end.

13. An apparatus as claimed in claim 12, characterized in that the first roller member is off-centered relative to the width of the magnetic tape guided by the guide roller.

14. An apparatus as claimed in claim 13, characterized in that the first roller member is slightly tapered.

15. An apparatus as claimed in claim 1, characterized in that the second roller member is one of (i) disc-shaped and (ii) pin-shaped.

16. A guide roller as claimed in claim 1, characterized in that the first roller member is mounted on the shaft via a radial ball-bearing having a race with opposite sides, the guide roller further includes sleeve-shaped spacers on said shaft at the opposite sides of the inner race the shaft has a free end and a height adjustment screw at free end, and in that the second roller member is pressed against the guide flange by the height adjustment screw via the ball-bearing inner race and via sleeve-shaped spacers provided at opposite sides of said inner race.

17. A guide roller as claimed in claim 1, characterized in that the shaft has a location of reduced diameter adjacent the guide flange, the shaft being constructed in such a manner that it can be bent away from the magnetic tape in the direction of the bisector of the wrapping angle.

18. A guide roller as claimed in claim 1, characterized in that the first roller member is mounted on the shaft via a radial ball bearing, the shaft has (i) a reduced diameter at the location of the radial ball-bearing, the ball bearing being adjustable transverse to the shaft at said reduced-diameter location, (ii) a free end, and (iii) a height adjustment screw at said free end, and in that, after a transverse adjustment of the ball bearing relative to the shaft, the radial ball-bearing can be immobilized by tightening the height adjustment screw at the free end.

19. A guide roller as claimed in claim 1, characterized in that the first roller member is positioned off-center relative to the width of the magnetic tape guided by the guide roller.

20. An apparatus as claimed in claim 1, characterized in that the first roller member is slightly tapered.

* * * * *